US012763974B2

(12) United States Patent
Heilman et al.

(10) Patent No.: US 12,763,974 B2
(45) Date of Patent: Oct. 13, 2026

(54) MULTI-PARTY SPLIT-KEY AUTHENTICATION

(71) Applicant: CLOUDFLARE, INC., San Francisco, CA (US)

(72) Inventors: Ethan Heilman, Cambridge, MA (US); Lucie Mugnier, Belmont, MA (US); Sharon Goldberg, Brookline, MA (US); John Merfeld, Brighton, MA (US); Yuval Marcus, Brookline, MA (US); Ann Ming Samborski, Oakland, CA (US); Saicharan Dadireddy, Quincy, MA (US)

(73) Assignee: CLOUDFLARE, INC., San Francisco, CA (US)

( * ) Notice: Subject to any disclaimer, the term of this patent is extended or adjusted under 35 U.S.C. 154(b) by 199 days.

(21) Appl. No.: 18/527,565

(22) Filed: Dec. 4, 2023

(65) Prior Publication Data

US 2024/0187258 A1 Jun. 6, 2024

Related U.S. Application Data

(60) Provisional application No. 63/429,824, filed on Dec. 2, 2022.

(51) Int. Cl.
*H04L 9/08* (2006.01)
*H04L 9/32* (2006.01)

(52) U.S. Cl.
CPC .......... *H04L 9/3263* (2013.01); *H04L 9/0825* (2013.01); *H04L 9/085* (2013.01); *H04L 9/0861* (2013.01)

(58) Field of Classification Search
CPC ..... H04L 9/3263; H04L 9/0825; H04L 9/085; H04L 9/0861
See application file for complete search history.

(56) References Cited

U.S. PATENT DOCUMENTS

2009/0265788 A1* 10/2009 Ehrenschwender ......................... G06F 21/6254 380/282
2018/0316492 A1* 11/2018 Ramachandran ..... H04L 9/0631
(Continued)

FOREIGN PATENT DOCUMENTS

CN 113193961 B * 12/2022 ........... H04L 9/3247
EP 3496331 A1 * 6/2019 ............. H04L 9/085
WO WO-2022228423 A1 * 11/2022 ............... H04L 9/30

OTHER PUBLICATIONS

"Mihir Bellare", "Ravi Sandhu", "The Security of Practical Two-Party RSA Signature Schemes" (Year: 2001).*

*Primary Examiner* — Darshan I Dhruv

(74) *Attorney, Agent, or Firm* — NICHOLSON DE VOS WEBSTER & ELLIOTT LLP

(57) ABSTRACT

Systems and methods are disclosed for performing multi-party, split-key authentication in cryptography. In certain embodiments, a system may comprise a key broker configured to receive a request for a root certificate, generate a secret key based on the request, generate the root certificate based on the secret key, split the secret key into a plurality of shards, provide a first shard of the plurality of shards to an agent, and delete the first shard at the key broker. The key broker may further receive a partially signed client certificate signed with the first shard, generate a fully signed client certificate based on the partially signed client certificate and a second shard of the plurality of shards, and issue the fully signed client certificate.

15 Claims, 11 Drawing Sheets

(56) References Cited

U.S. PATENT DOCUMENTS

| | | | | |
|---|---|---|---|---|
| 2020/0111080 | A1* | 4/2020 | Metcalfe | H04L 9/3255 |
| 2020/0153640 | A1* | 5/2020 | Ranellucci | H04L 9/3255 |
| 2020/0213135 | A1* | 7/2020 | Wainblat | H04L 9/0819 |
| 2021/0083882 | A1* | 3/2021 | Venable, Sr. | H04L 9/3268 |
| 2021/0105138 | A1* | 4/2021 | Tysor | H04L 9/3066 |
| 2022/0029801 | A1* | 1/2022 | Velagapalli | H04L 9/0877 |
| 2023/0128131 | A1* | 4/2023 | Peddada | H04L 9/3263<br>713/171 |
| 2023/0130121 | A1* | 4/2023 | Peddada | H04L 9/0825<br>713/171 |
| 2024/0356909 | A1* | 10/2024 | Hess | H04L 9/3247 |

* cited by examiner

MULTI-PARTY SPLIT-KEY AUTHENTICATION

CROSS-REFERENCE TO RELATED APPLICATION

The present application claims priority to U.S. provisional patent application, Application No. 63/429,824, filed Dec. 2, 2022, entitled "A multi-party, trustless system for ephemeral, certificate-based authentication", the contents of which are hereby incorporated by reference in their entirety.

TECHNICAL FIELD

Various embodiments of the present technology relate to network security and credentials.

BACKGROUND

Entities such as service providers and companies need the ability to have their users access resources that are behind firewalls in a highly secure manner that reduces both the probability of compromise and the impact of compromise if it occurs. Bastion hosts, proxying agents, or other intermediary services, such as BastionZero®, may solve the problem of immutable, authorized, loggable access to hosts via agents within such a protected system. For examples of secure access via a bastion host or intermediary co-signer system, see U.S. patent application Ser. No. 17/590,657, entitled "Zero Trust Authentication", the contents of which are incorporated herein. However, there still remains the issue of secure authenticated access to resources such as a database.

If an entity is using the bastion host or proxying agent as a proxy for accessing a secure target system, a user can get secure access into the system, but the ultimate destination might be another resource only accessible from within that system or an asset on the same host machine. Some resources are configurable to authenticate via certificate, but certificates may also have limitations.

Certificate credentials are powerful, in that anyone with a given set of credentials can use them to access whatever resource the credentials authorize. This could be the legitimate user, for whom the credentials were generated, or a malicious attacker who can use those same credentials for nefarious or unauthorized access. Protecting credentials is paramount since letting them fall into the wrong hands can lead to serious damage or data loss. Keeping credentials secure may be even more difficult when the credentials are long-lived, as there are more chances for attackers to find them, and if no one notices the compromise, those credentials can be used until the natural cycle of their regeneration. A judicious enterprise should assume that any secret can and will be compromised. Systems and methods are needed to ensure a single exposed secret cannot destroy the security of the system built on top of it.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In certain embodiments, a system may comprise a key broker configured to receive a request for a root certificate, generate a secret key based on the request, generate the root certificate based on the secret key, split the secret key into a plurality of shards, provide a first shard of the plurality of shards to an agent, and delete the first shard at the key broker. The key broker may further receive a partially signed client certificate signed with the first shard, generate a fully signed client certificate based on the partially signed client certificate and a second shard of the plurality of shards, and issue the fully signed client certificate.

In certain embodiments, a method may comprise receiving, at a key broker, a request for a root certificate, generating, at the key broker, a secret key based on the request, and generating, at the key broker, the root certificate based on the secret key. The method may further comprise splitting the secret key into a plurality of shards via the key broker, providing a first shard of the plurality of shards from the key broker to an agent, and deleting the first shard at the key broker. The method may further comprise receiving, at the key broker, a partially signed message signed with the first shard, generating, at the key broker, a fully signed message based on the partially signed message and a second shard of the plurality of shards, and issuing the fully signed message.

In certain embodiments, a memory device may store instructions that, when executed, cause a processor to perform a method comprising receiving, at a key broker, a request for a root certificate, generating, at the key broker, a secret key based on the request, and generating, at the key broker, the root certificate based on the secret key. The method may further comprise splitting the secret key into a plurality of shards via the key broker, providing a first shard of the plurality of shards from the key broker to an agent, and deleting the first shard at the key broker. The method may further comprise receiving, at the key broker, a partially signed message signed with the first shard, generating, at the key broker, a fully signed message based on the partially signed message and a second shard of the plurality of shards, and issuing the fully signed message.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
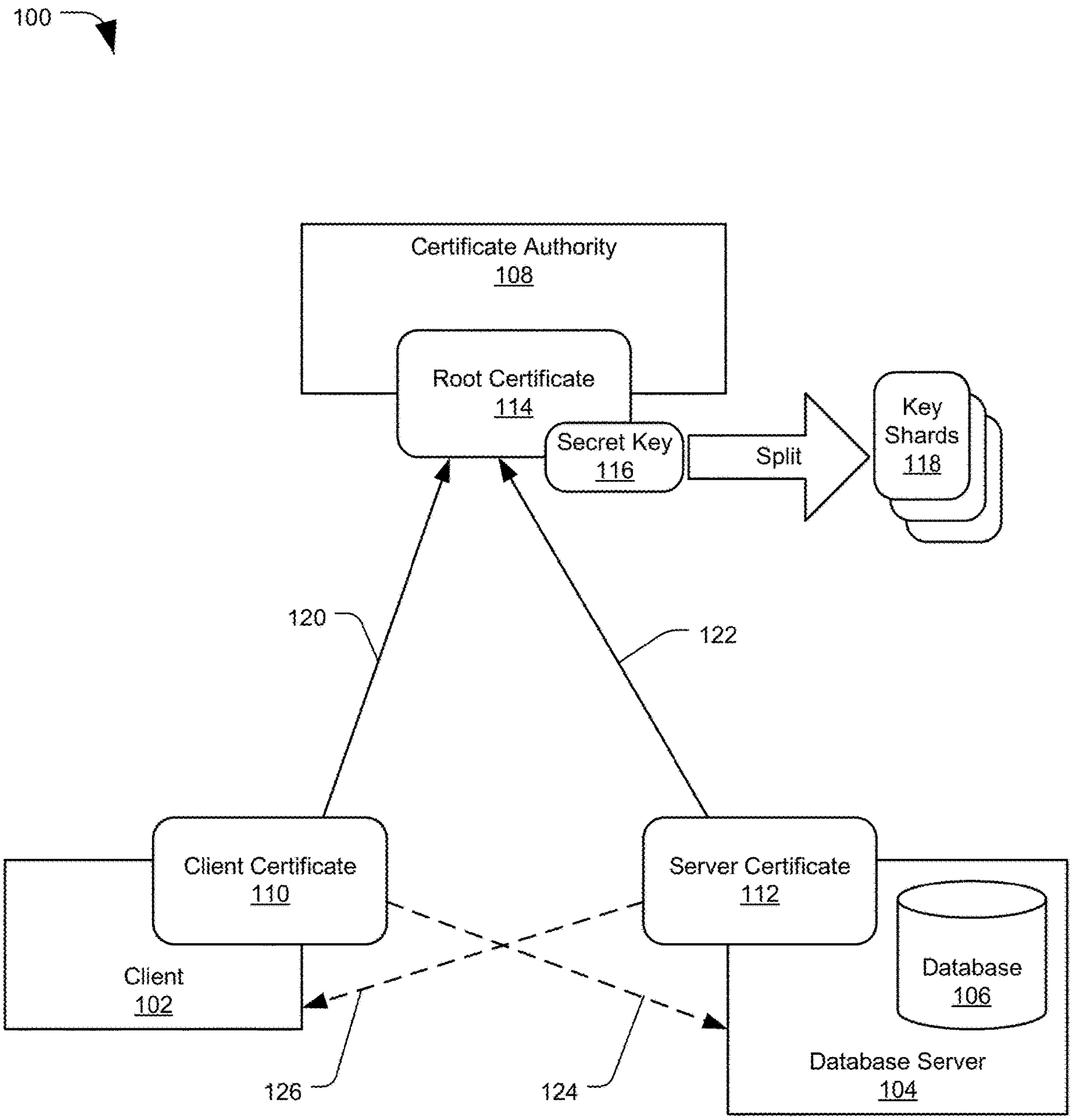
FIG. 1 is a diagram of a system configured to perform multi-party split-key authentication, in accordance with certain embodiments of the present disclosure.

FIG. 1 depicts a diagram of a system 100 configured to perform multi-party split-key authentication, in accordance with certain embodiments of the present disclosure. The system 100 may include a user system or client 102, a database server 104 and an associated database 106, and a certificate authority 108. Elements of system 100 may be implemented via computers, servers, hardware and software modules, or other system components. The components of system 100 may be located remotely or locally to one another, and may communicate over networks such as the internet, one or more intranets, mobile networks, other networks, and the physical and software components thereof. In some embodiments, components of system 100 may have one or more associated security certificates. For example, client 102 may have an associated client certificate 110, database server 104 may have an associated server certificate 112, and certificate authority 108 may have an associated root certificate 114.

Certificate ecosystems are based on signing. Messages may be signed with a secret key and then verified with the corresponding public key. Certificates may include a public key for the given entity, as well as information such as an issuer of the certificate. Child certificates may be signed by parent certificates, and the chain flows all the way up to a single, powerful, self-signed root certificate, such as root certificate 114. The issuer and signer of a root certificate 114 may be referred to as a certificate authority (CA) 108, which may be an entity with the power to issue, store, and sign new certificates.

Components or resources that use certificates for authentication may be designed to trust a certificate high up in the chain of authority or signatures. This trusted certificate may have the power to endlessly issue valid certificates as long as the trusted certificate isn't expired. There may only be one secret key 116 for issuing and signing child certificates, and whoever possesses it may have the power to issue valid certificates for their own benign or nefarious purposes. Because of this, the signing key 116 of these root certificates 114 may be a closely guarded secret.

Accordingly, splitting a single secret key 116 into multiple parts would decentralize the enticement for attackers to target a single key. After generating the root certificate 114, the secret 116 may then be split into multiple shards 118. Each of these new key shards 118 may be a secret distributed to a different location which are each required to collaboratively sign any new certificate for it to be valid. The compromise of any single key shard 118, or a subset of key shards 118 such that there remains one uncompromised, will not empower the compromiser with the ability to issue valid certificates. The multi-party split key authentication protocol may be referred to as "MPZ". The split key 118 protocol may work in any situation where certificates are used for authentication, such as TLS (Transport Layer Security) or SSH (Secure Shell Protocol).

An example utilization for the split key 118 MPZ system may be to deploy database authentication in a decentralized architecture so that split keys 118 are held in different locations managed and employed by separate entities.

There may be a number of potential patterns for deploying and managing databases. These can be separated into two categories, depending on distribution of a database server 104:

1. Hosted (or remote hosted): solutions, such as MongoDB® Atlas, offer to keep and manage databases 106, including duplicates and backups, etc. although some configuration may be up to the customer.
2. Self-hosted: In this approach, databases 106 may be deployed on controlled and self-managed servers such as Postgres®.

Each hosting pattern also tends to follow different certificate management practices because of the degree of control a customer has over the database server 104 itself.

Databases may allow access based on roles. Similar to the concept of a computer user, these roles may be configurable to control what a user (e.g., via client 102) can and cannot do in a database 106 and what authentication method to use that allows the user to log in. Although passwords may be used, authentication via X.509 certificate is another option.

In order to set up the database 106 for a certificate authentication method, the database server 104 (or a configuration UI if the database 104 is not self-hosted) can be configured to trust a root certificate 114. The database 106 can check that every certificate presented for user authentication, which may be referred to as the "client certificate" 110, is signed by the Root Certificate 114. Databases 106 may require that the client certificate's 110 Common Name (CN) corresponds to the role that a user is trying to authenticate as. This way, a single Client Certificate 110 may only be scoped for a single role and does not grant any user 102 arbitrary access to any role.

In the case of a self-hosted database 106, the database server 104 may utilize a Server Certificate 112 likewise signed by the Root Certificate 114. The server certificate 112 may allow the user 102 to authenticate the server 104, for example by checking if the presented server certificate 112 is signed by the same CA 108 that signed the client certificate 110, to ensure the client 102 is communicating with the intended database 104.

In a simple diagram of an embodiment, the certificate hierarchy may look like the system 100 depicted in FIG. 1. Although practicality allows for more complicated setups with intermediary certificates, the discussion of certificate authentication herein will remain based on this simplified architecture.

Certificate authority 108 may generate a secret key 116 and public key (not shown) pair, and generate a root certificate 114 including the public key. The root certificate 114 may be signed by the secret key 116. The secret key 116 may be split into a plurality of key shards 118 and distributed among trusted systems, and the single original secret key 116 may be erased or destroyed.

The root certificate 114 may be used to generate 120 a client certificate 110, and the client certificate 110 may be signed based on all of the split key shards 118 and provided to client 102. Similarly, the root certificate 114 may be used to generate 122 a server certificate 112, and the server certificate 110 may be signed based on all of the key shards 118 and provided to database server 104.

When client 102 seeks to access database 106, it may engage in one or more security exchanges or "handshakes" with database server 104. For example, database servers 104 may rely on TLS (transport layer security) to establish an authenticated connection with the user's client 102. As part of a TLS handshake, the client 102 may present its certificate 110 to server 104, and the server 104 may present its own certificate 112 to client 102. Each party may verify that the other's certificate has been signed by some trusted Root Certificate 114 issued by a trusted certificate authority 108 and has not expired. After presenting each with its certificate, the parties may negotiate an ephemeral key pair to optionally encrypt messages during the TLS session. Each party may verify that signed messages exchanged during the key exchange protocol originate from the holder of the corresponding certificate 110 or 112. In some examples, a database 106 may not directly use certificates to authenticate, which authentication may occur at layer 7 in the Open System Interconnection (OSI) model (the application layer), and may instead rely on the TLS connection at layer 4 (the transport layer).

When both the client 102 and the server 104 present and authenticate each others' certificates, this may be called "mutual authentication". Both TLS and some databases 106 support mutual authentication in addition to client-only authentication, where the client 102 is the only one presenting their certificate 110 for authorization.

An example public key cryptosystem may use RSA (Rivest-Shamir-Adleman) encryption to "sign" a message or certificate, and to verify a signed message. RSA may utilize the following algorithm:

m is the message
(e, N) is the public key
d is the secret key
sig is the signature
H is a full domain hash
SIGN(m, d): H(m)d mod N→sig
VER(m, sig, e): (SIG)e mod N≡H(m)
This works because e and d are inverses so
(SIG)e mod N≡(H(m)d)e mod N≡H(m) mod N Multi-Party Computation (MPC) may be a process that allows multiple parties to jointly sign a message or certificate without any one party being able to sign by themselves. That is, all parties must consent and cooperate to sign a statement. Splitting a secret key 116 into multiple key shards 118 may allow for using MPC to sign future child certificates. A malicious actor would need to gain unauthorized access to all key shards 118 in order to create spoof certificates that would grant unauthorized access to resources such as database 106.

An MPC version of RSA may be employed using a set of private key shards 118. In some embodiments, it can be combined with the added generation of per-shard public key shards. The public key shard values, denoted as $e_1, e_2, \ldots, e_k$ below, may allow parties to "blind" messages so that signatures are protected against side-channel attacks. In cryptography, blinding is a technique by which an agent can provide a service to (e.g., compute a function for) a client in an encoded form without knowing either the real input or the real output. The MPC RSA algorithms may utilize the following definitions:

m is the message
d is the RSA secret key
(e, N) is the RSA public key
Φ is the Euler totient of N
$d_1, d_2, \ldots, d_k$ is a set of private key shards 118 held by up to k parties
$e_1, e_2, \ldots, e_k$ is an optional set of public key shards; each pairs with a private shard 118
sig is the signature
H is a full domain hash Below are examples of two equally secure algorithms that determine both how the private key 116 is split and how signatures are generated. One approach is to use a multiplicative algorithm, and the other is to use an additive algorithm.

The process to generate key shards 118 may involve a broker using a key splitting algorithm. The broker may refer to whichever party is generating and splitting the keys, such as certificate authority 108, although another entity may perform the operations. As the security of the key splitting procedure may be based around the complete secret key being split and thereafter not known, the responsibility of the broker may be left to a trusted third party. In some examples, the broker may split the key using one of the following algorithms:

Generate key shards 118:
1. Broker creates key d such that: $H(m)^d \bmod N \rightarrow sig$
2. Broker splits d into $\{d_1, d_2, \ldots, d_k\}$
   a. Multiplicative algorithm:
      i. Think of d as a "seed" value that we will split to generate two shards
      ii. $d_1 \leftarrow rand()$
      iii. $d_2 \leftarrow d/d_1 \bmod \Phi$
      iv. If $k > 2$, discard $d_2$, and use $d_1$ as the new seed value to generate $d_2$ and $d_3$. Continue until all shards are generated
      v. Optionally, for each shard $d_i$, $e_i \leftarrow d_i^{-1} \bmod \Phi$
   b. Additive algorithm:
      i. $\{d_1, d_2, \ldots d_{k-1}\} \leftarrow rand()$
      ii. $d_k \leftarrow$ such that sum of all shards = $d \bmod \Phi$
3. Broker distributes shards to parties, then deletes distributed shards.

Since the broker may have had possession of the original key d, it may be advantageous to have the broker distribute all shards and delete all data of the secret key and all shards. In other examples, the broker may maintain a shard, and delete only the shards distributed to other parties (and the original key d).

Once a secret key is split, the key shards 118 may be used to sign a message using the following algorithms:

Signing:

1. Multiplicative algorithm:
   a. Signature built sequentially; first party signs the message
   b. $H(m)^{d1} \bmod N \rightarrow sig_1$
      i. Optionally, $e_1$ can be used to sign with blinding to prevent side-channel attacks
   c. Next party signs (with optional blinding)
   d. $sig_1^{d2} \bmod N = H(m)^{(d1*d2)} \bmod N \rightarrow sig_2$
   e. This continues until finally:
   f. $Sig_{\{1, 2, \ldots, k-1\}}^{dk} \bmod N = H(m)^{(d1 * d2 * \ldots * dk)} \bmod N \rightarrow sig$
2. Additive algorithm
   a. All parties sign their own copy of the message
   b. $H(m)^{di} \bmod N \rightarrow sig_i$
   c. Final party, who may or may not have a key shard, combines the signatures:
   d. $sig_1 * sig_2 \ldots * sig_k \rightarrow sig$ An example system for generating a root certificate 116 and distributing split key shards 118 is described in regard to FIG. 2.

Figure 2:
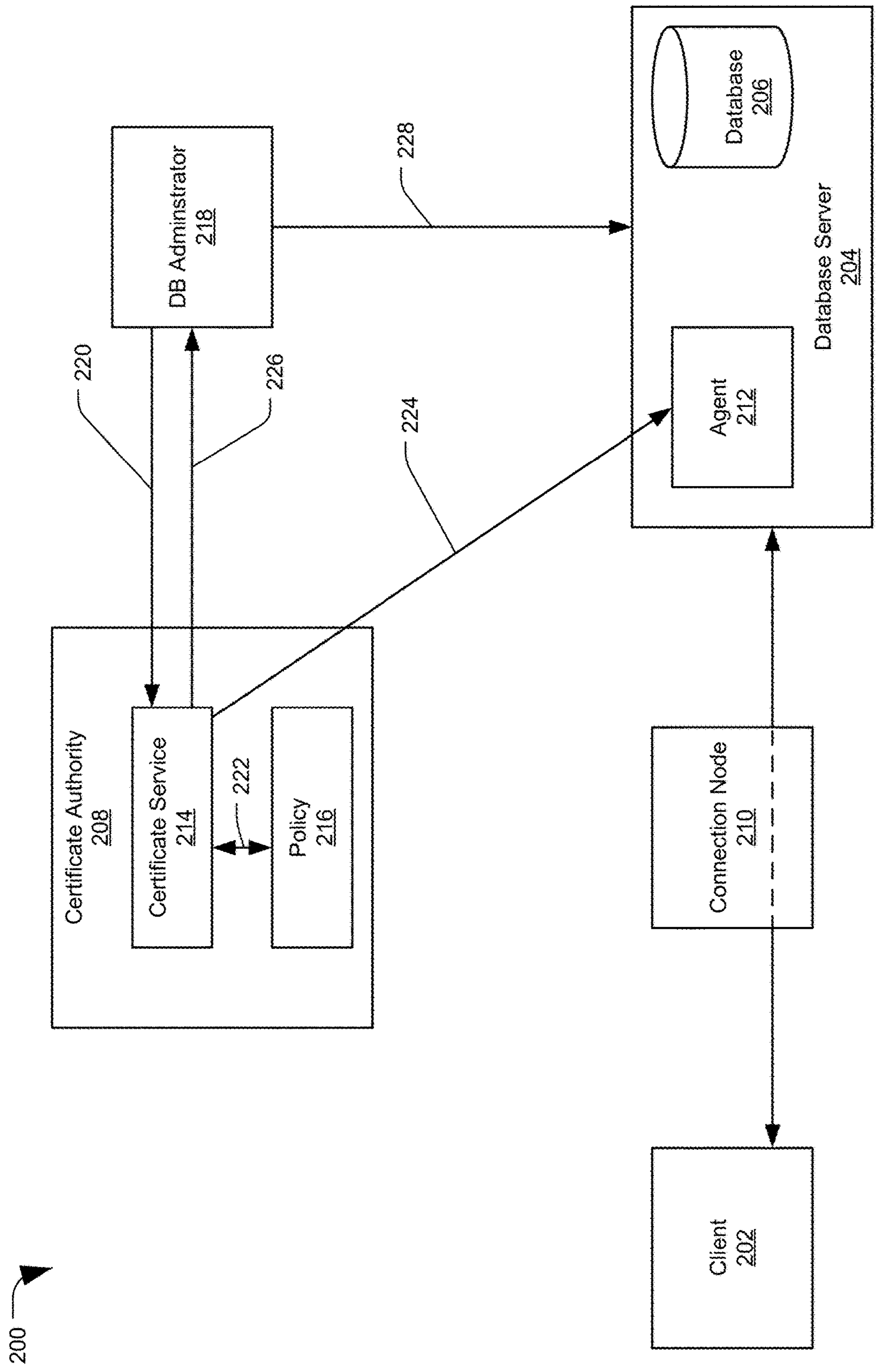
FIG. 2 is a diagram of a system configured to perform multi-party split-key authentication, in accordance with certain embodiments of the present disclosure.

FIG. 2 depicts a diagram of a system 200 configured to perform multi-party split-key authentication, in accordance with certain embodiments of the present disclosure. In particular, system 200 provides an example architecture for root certificate generation and secret key splitting. The system 200 may include a client system 202, a database (DB) server 204, a certificate authority 208, a connection node 210, and a DB administrator 218. The components of system 200 may communicate via wide area networks, local area networks, or any combination thereof. Components of system 200 may correspond to components described in regard to FIG. 1.

The client 202 may be a user system that may seek to access the database 206, for example via agent 212, and possibly by way of connection node 210. The client 202 may need to be validated to access the database 206, which may include client certificates or other authorization procedures.

The database server 204 may include a database 206 and an agent 212. The agent 212 may be a module configured to control access to database 206, and may manage certificate validation operations. In some examples, the agent 212 may also receive a key shard, and coordinate with certificate authority 208 or other entities to perform MPC signing of certificates.

The DB administrator 218 may be a computing system used to configure the database server 204, agent 212, and database 206 regarding access rights and authentication procedures. In some examples, the DB administrator 218 may be part of or running database server 204 or agent 212.

The certificate authority 208 may include a certificate service 214 and a policy engine or module 216. The certificate authority 208 may be a broker configured to create the key shards, and may be a signer using one of the shards. In some examples, the certificate authority 208 may generate the ultimate root certificate, but in other examples it may be a separate entity that merely splits a key of a child certificate. A child certificate of an ultimate root certificate may itself operate as a parent certificate for its own child certificates.

The certificate service 214 may be responsible for generating certificates, splitting keys, and storing all necessary information. The certificate service 214 may be trusted to act as the key shard dealer. It may be assumed that any compromise of the certificate service 214 happens after it has deleted any distributed shards. The policy engine 216 may be a set of rules or policies that the certificate service follows in authorizing and generating certificates. For example, the policy engine 216 may have rules set out by customers (e.g., database server 204) designating which users have access or authorization for which roles. In some embodiments, the certificate authority 208 (and optionally the connection node 21) may be implemented as an intermediary using a trustless architecture, by employing protocol used elsewhere in MPC implementations.

Connection node 210 may be one or more intermediary services, bastion hosts, or network nodes between client 202 and database server 204. Connection node 210 may relay information, and may perform message logging, message format conversion, authentication or policy enforcement, proxy services, or other operations. In some examples, connection node 210 may be co-located or operated by the same entity as the certificate authority 208.

DB administrator 218 may send an application programming interface (API) request 220 to generate a new x.509 certificate (such as a root certificate for access control to database 206) to the certificate service 214 of certificate authority 208. In cryptography, X.509 is an International Telecommunication Union (ITU) standard defining the format of public key certificates. An X.509 certificate may have various data fields containing information about the identity that the certificate is issued to as well as the identity of the issuer CA, validity period, cryptography algorithms used to sign the certificate, or other details.

In response to the certificate request 220, the certificate service 214 may perform a policy check 222 to the policy engine 216. The policy check 222 may include comparing details about a user associated with DB administrator 218 from the request 220 against the policy engine 216 to ensure that the user has sufficient permission to generate the requested root certificate.

If the request 220 satisfies the policy check 222, the certificate service 214 may generate an RSA key pair including a public key and a secret or private key, and use the keys to generate a self-signed X.509 root certificate. Before or after signing the certificate, the certificate service 214 may split the secret key using MPC RSA into a plurality of key shards (e.g., $shard_1, \ldots shard_n$). The certificate service 214 may retrieve a list of all agents associated with the provided virtual DB target or environment (e.g., associated with database server 204), and then send some or all of the key shards to the identified agents. For example, a key shard may be sent 224 to agent 212 at the database server 204. In some examples, another shard may be sent to connection node 210 or other agents. Depending on configuration, the certificate service 214 may distribute all the shards, or it may retain a shard and act as one of the signing agents. The certificate service 214 may then delete the data for all distributed shards, while saving all information necessary for issuing client certificates. For example, the retained information for issuing client certificates may include agent IP addresses or other information for agents holding shards, a necessary signing order for agents, a signing protocol or algorithm to use, etc. In examples where the secret key is split prior to signing the created certificate, the certificate service 214 may use all key shards to sign the root certificate prior to distributing them, or it may distribute the shards and then initiate a signing operation on the certificate with the determined signing agents.

The certificate service 214 may then show a copy or send 226 the X.509 root certificate, and optionally a shard (e.g., the shard sent to agent 212) to DB administrator 218, and may provide documentation or information how to configure the database to accept the certificate. The DB administrator 218 may configure the database 206, database server 204, agent 212, or a combination thereof, to recognize the generated root certificate as a trusted root or parent certificate for any child certificates that may be generated from the root certificate. According to this process, the generated root certificate may be used to generate client certificates to grant access rights to client 202. The certificate authority 208 may retain the original root certificate and generate child certificates, while the DB administrator 218 may merely use the root certificate information to configure the database 206, and then delete or not use the root certificate copy it received.

An example reason a copy of a shard sent to agent 212 may be provided to DB administrator 218 may be for instances where the agent 212 is an ephemeral node, which may be invoked or terminated according to need. New instances of the agent 212 may be invoked and provided with the appropriate key shard by DB administrator 218 to perform signing operations.

Instead of having a third party operate as the Certificate Authority 208 granting access to a database owner's database, the split key architecture also allows for database owners (e.g., DB administrator 218) to provide their own root certificate. In this case, the owner may control the original root key, and may generate a child certificate with its own set of secret and public keys, which may be provided to the certificate authority 208. The certificate authority 208 may split and distribute its secret key, and use its child certificate as a root certificate for generating client certificates for database 206 access. However, a parent certificate would allow a database owner to revoke the certificate authority's 208 certificate at the database owner's discretion and establish themselves as the root of trust for a given database 206. An example system for client certificate generation is described in regard to FIG. 3.

Figure 3:
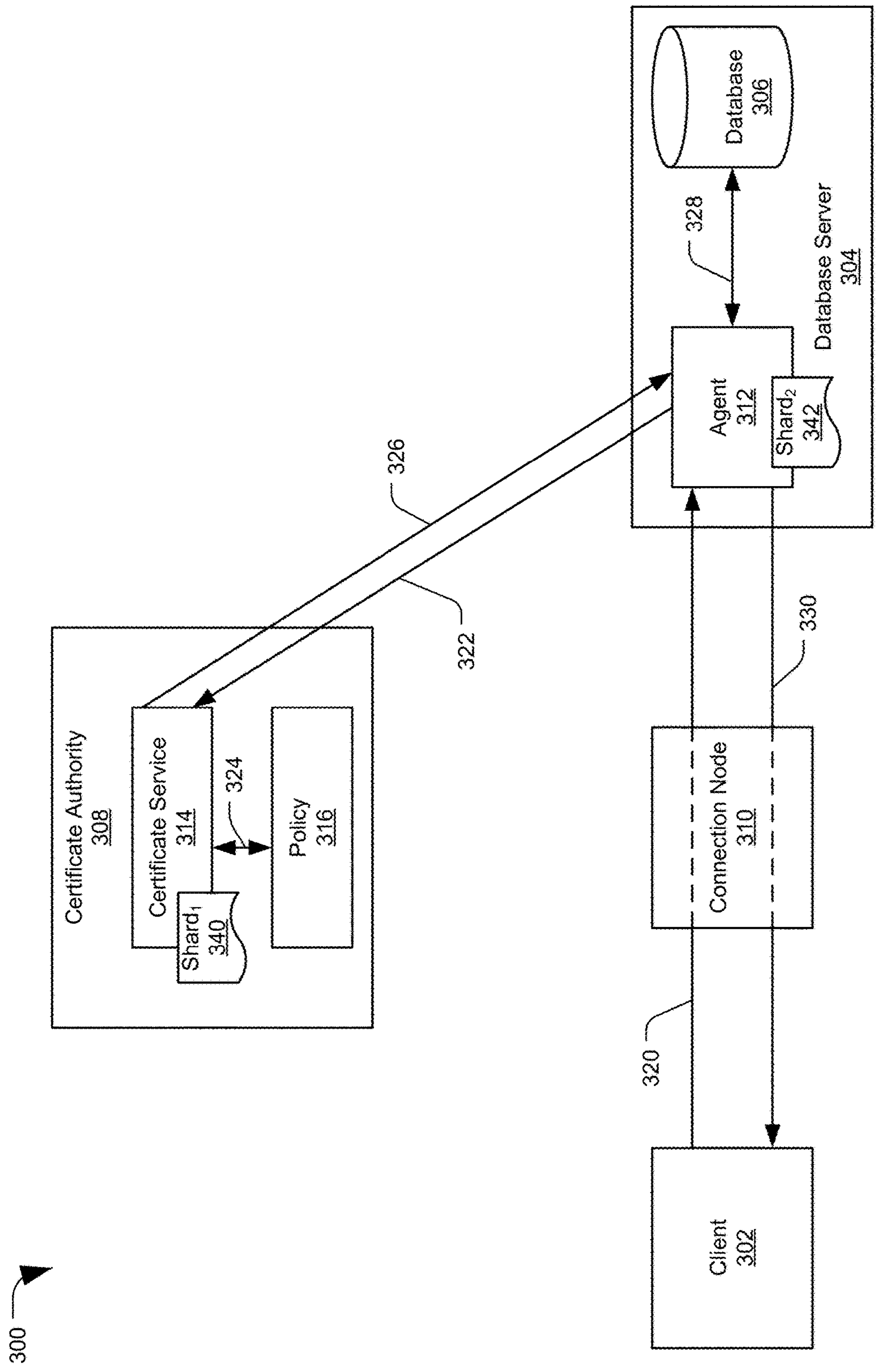
FIG. 3 is a diagram of a system configured to perform multi-party split-key authentication, in accordance with certain embodiments of the present disclosure.

FIG. 3 depicts a diagram of a system 300 configured to perform multi-party split-key authentication, in accordance with certain embodiments of the present disclosure. In particular, system 300 provides an example architecture for client certificate generation using a set of split keys. The system 300 may include a client system 302, a database server or system 304, a certificate authority 308, and a connection node 310. The components of system 300 may communicate via wide area networks, local area networks, or any combination thereof. Components of system 300 may correspond to components described in regard to FIGS. 1 and 2.

The example architecture of system 300 may rely on a certificate private key split into two shards: $shard_1$ 340 held by an intermediary for the database owner (such as certificate authority 308, and optionally including connection node 310) and $shard_2$ 342 held by an agent 312 in the database owner's environment.

Client 302 may include a client system for accessing database server 304, such as psql or DBeaver®. Client 302 may initiate a connection 320 to agent 312 at database system 304 (e.g., via connection node 310) based on sending a message. The message may be signed or authenticated by client 302 using various security protocols to establish a user's identity. The message may request a client certificate to access the database 306, or may merely request access to the database 306, and may include a current timestamp, which may be verified by the agent 312 and certificate service 314, respectively, when received at those entities.

In some examples, the connection node 310 may perform a proxy policy check, verifying the user of client 302, the user's role, and the target DB 306. A database owner may have set policy rules at the connection node 310 regarding user and role access to the database.

The agent 312 may receive the message 320, and in response may generate a signing key pair, and use the key pair to generate an X.509 client certificate. The signing key pair and the client certificate may be ephemeral and used to establish a single or limited number of connections before expiring. The agent 312 may partially sign the certificate using $shard_2$ 342 using a signing algorithm as described above. The agent 312 may then send 322 the partially signed certificate to the certificate service 314, with a request to complete the signing.

The certificate service 314 may perform a policy check 324 with the policy engine 316. As described previously, the policy check 324 may include comparing details about client 302 or an associated user against the policy engine 316 to ensure that the user has sufficient permission to generate the requested certificate or to access the database 306 using a specified role. The certificate service 314 may ensure the certificate expiration is within an expected range.

Once the checks have been completed, the certificate service 314 may sign the certificate using $shard_1$ 340 according to an MPC RSA signing algorithm as described above, and return 326 the completely signed certificate to agent 312.

The agent 312 may then present 328 the signed client certificate to database 306 when establishing a TLS connection for the client 302. The database 306 may verify the certificate and allow the TLS connection. The agent 312 or database 306 may send client 302 a message or notification that the TLS connection between the client 302 and database 306 has been established, and that the client 302 may now access the database 306. All traffic between client 302 and database 306 may go through the TLS connection. An advanced architecture example is presented in FIG. 4.

Figure 4:
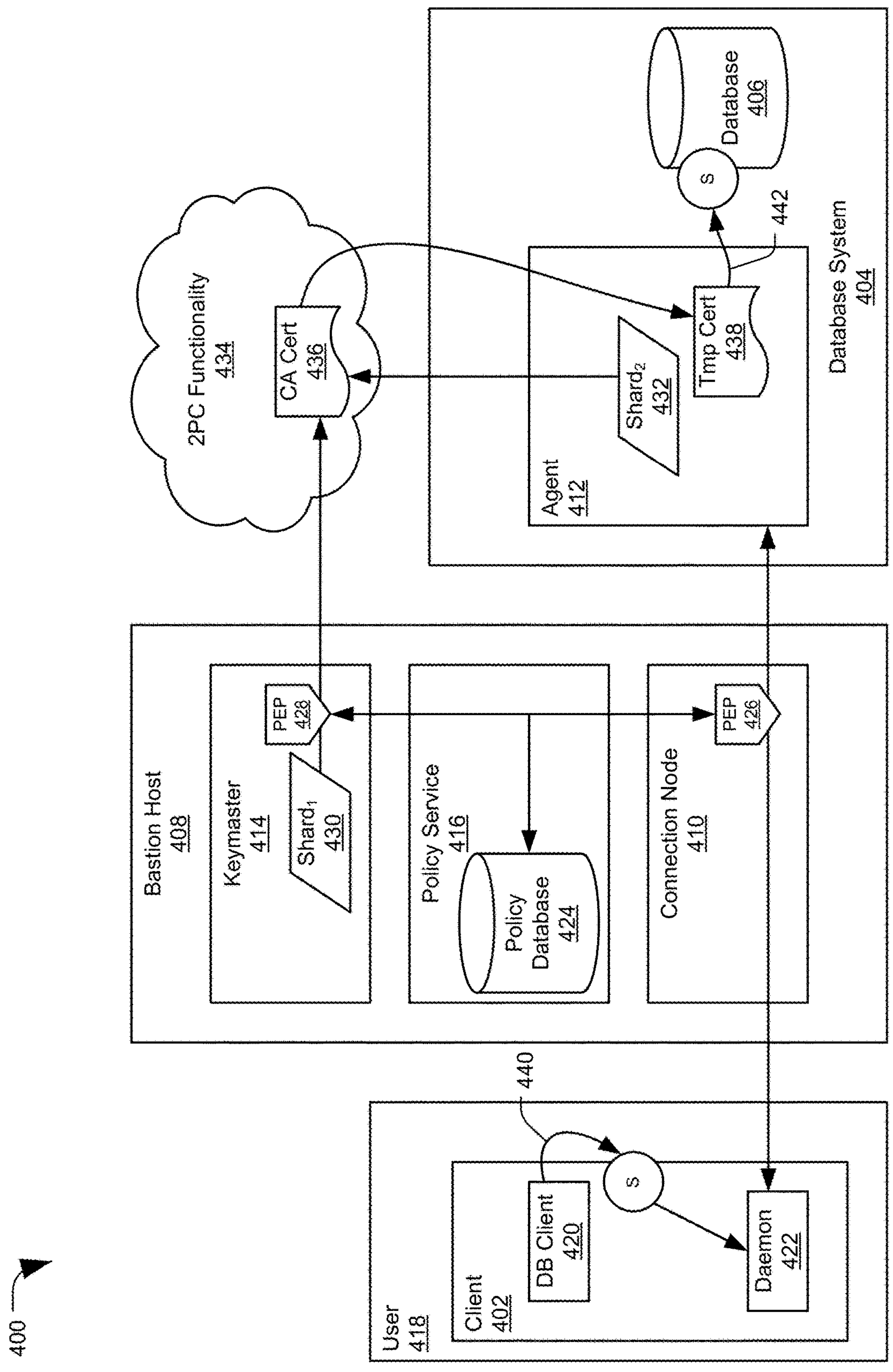
FIG. 4 is a diagram of a system configured to perform multi-party split-key authentication, in accordance with certain embodiments of the present disclosure.

FIG. 4 depicts a diagram of a system 400 configured to perform multi-party split-key authentication, in accordance with certain embodiments of the present disclosure. In particular, system 400 provides an example architecture for client certificate generation using a set of split keys. The system 400 may include a client system 402 within the domain of a user 418, a database system 404 including an agent 412 and a database 406, and a bastion host 408 including a keymaster 414, a policy service 416, and a connection node 410. The architecture of system 400 may be referred to as a "simple MPZ" architecture. The components of system 400 may communicate via wide area networks, local area networks, or any combination thereof. Components of system 400 may correspond to or share functionality with components described in regard to FIGS. 1-3.

As described in regard to FIG. 3, a user 418 may wish to access a database 406 within a protected database system 404 via the user's client system 402. The user may access a database (DB) client 420, which may include an application having a graphical user interface (GUI) for accessing and interacting with the database 406. The DB client 420 may initiate a first TLS connection 440 with a listening transmission control protocol (TCP) socket denoted by the circular modules having an "S" symbol in FIG. 4. The TCP socket may send the request from the DB client 420 to a daemon 422, which may be a computer program that runs as a background process on client 402.

The daemon 422 may send a request to establish a connection with the database 406 towards the agent 412 in database system 404 by way of a connection node 410 of a bastion host system 408. The bastion host 408 and connect node 410 may be configured to act as a proxy for database system 404, and to ensure only users with appropriate access rights and roles can access the database system 404. The connection node 410 may verify the user 418 using a policy enforcement point (PEP) 426, which may access the policy service 416 and its associated policy database 424. The policy database 424 may store policy rules and requirements for customers of the bastion host, such as database system 404. The connection node 410 may compare the database access request from client 402 against the policy rules to ensure the user 418 has access rights. If authorized, the connection node 410 may pass the database connection request on to the agent 412 of the database system 404. Whether or not the connection request was authorized and forwarded, the connection node 410 may perform other operations, such as logging the message.

In an example implementation, the connection node 410 may also provide a copy of the database connection request to the keymaster 414 of bastion host 408. The keymaster 414 may act as a holder of one key shard used to sign client certificates for providing access to database system 404; in this case, $\text{shard}_1$ 430. The keymaster 414 may perform its own policy checks via PEP 428, or may rely on the policy check from connection node 410. In a configuration where the keymaster 414 is a first signing entity for a certificate, the keymaster 414 may generate a signing key pair, and use the key pair to generate an X.509 client certificate for user 418 or client 402. The keymaster 414 may then partially sign the certificate using $\text{shard}_1$ 430.

Once the connection node 410 has verified the database connection request from client 402 and forwarded it to agent 412, the agent may also perform key signing duties using its own shard of the secret key used to sign client certificates, $\text{shard}_2$ 432. In examples where the agent 412 is a first signing entity for a certificate, the agent 412 may generate a signing key pair, and use the key pair to generate an X.509 client certificate for user 418 or client 402. The agent 412 may then partially sign the certificate using $\text{shard}_2$ 432.

The signatures from $\text{shard}_1$ 430 and $\text{shard}_2$ 432 may be combined via multi-party computation (MPC), for example 2PC (two-party computation, a type of MPC) protocol functionality 434. 2PC may be a type of atomic commitment protocol (ACP) providing a distributed algorithm that coordinates all the processes that participate in a distributed atomic transaction on whether to commit or abort (roll back) the transaction. In the example of split key signing, the split key signatures may be fully combined to sign a client certificate via a CA certificate 436. The CA certificate 436 may represent the combined secret key for signing a client certificate, rather than an actual root certificate for a certificate authority. Different implementations may have the 2PC functionality carried out by another entity or agent, or by agent 412, keymaster 414, or by another entity holding a key shard. For example, the agent 412 may generate the client certificate and partially sign it, then provide the partially signed certificate to keymaster 414 for applying its portion of the signature. In another example, the keymaster 414 may generate the client certificate and partially sign it, then provide the partially signed certificate to agent 412 for a final portion of the signature.

Once all key shards have been used to sign the client certificate, it may produce a temporary (Tmp) certificate 438 to function as the client 402 certificate. The Tmp certificate 438 may be ephemeral with a set expiration period, or may be configured to authenticate a single or limited number of connections. The agent 412 may be provided a copy of the temporary certificate 438, and present it, via a second TLS connection 442, to a TCP socket of database 406 for authorization. Once authorized, a TLS connection may be established between database 406 and client 402. If the user 418 wishes to access the database 406 after the temporary certificate 438 has expired, a new client certificate may need to be generated as described above. Another example split-key MPZ architecture is described in regard to FIG. 5.

Figure 5:
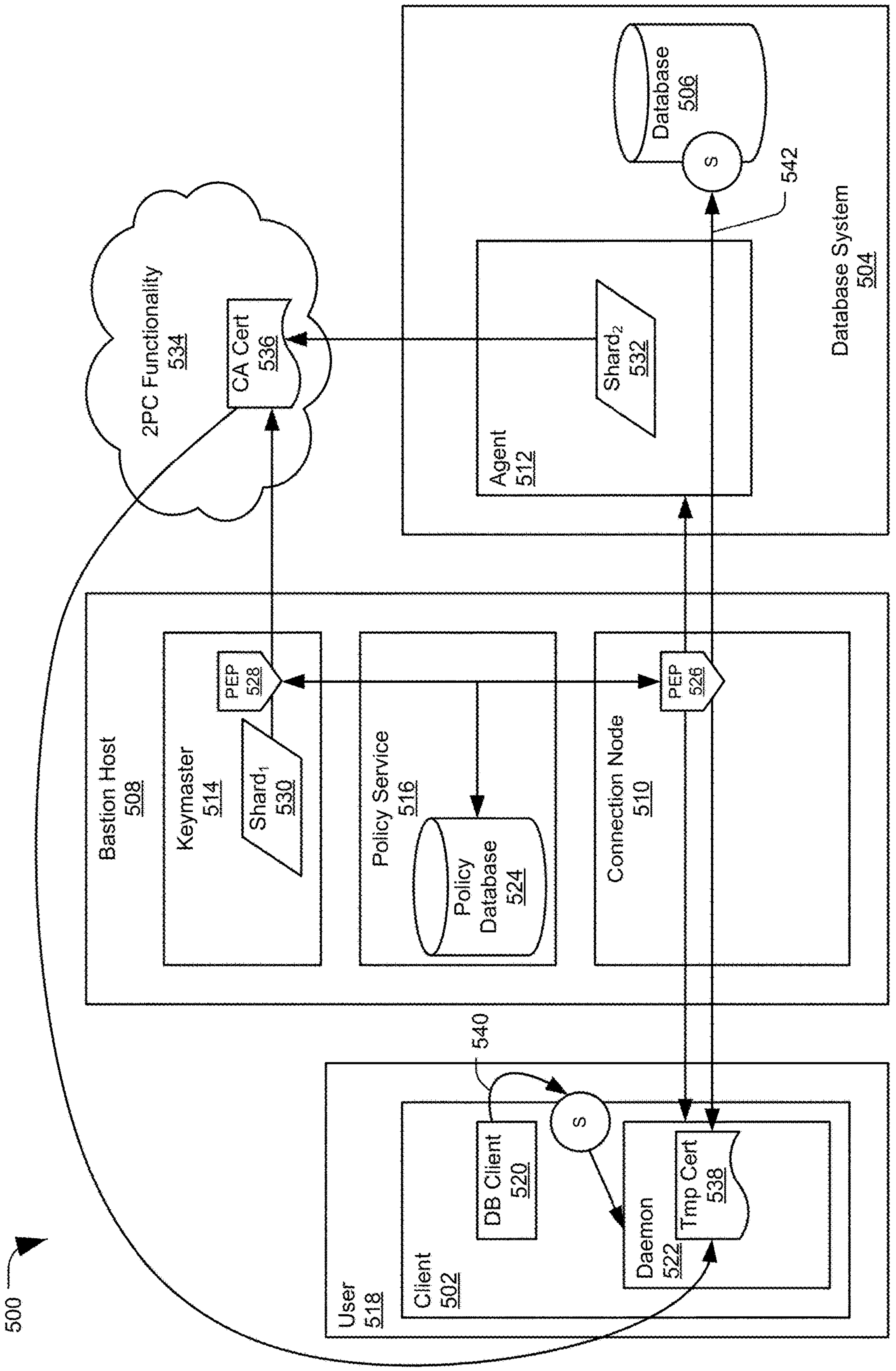
FIG. 5 is a diagram of a system configured to perform multi-party split-key authentication, in accordance with certain embodiments of the present disclosure.

FIG. 5 depicts a diagram of a system 500 configured to perform multi-party split-key authentication, in accordance with certain embodiments of the present disclosure. In particular, system 500 provides an example architecture for client certificate generation using a set of split keys. The system 500 may include a client system 502 within the domain of a user 518, a database system 504 including an agent 512 and a database 506, and a bastion host 508 including a keymaster 514, a policy service 516, and a connection node 510. The architecture of system 500 may be referred to as a "protected MPZ" architecture. The components of system 500 may communicate via wide area networks, local area networks, or any combination thereof. Components of system 500 may correspond to or share functionality with components described in regard to FIGS. 1-4.

The protected MPZ architecture of system 500 may provide more security against a compromised agent 512 than the simple MPZ architecture of system 400, but may be more complex to implement. Simple MPZ may be easier to build and may provide the same security against a compromised bastion host 508.

Much of the design of system 500 matches the design of system 400 of FIG. 4. A user 518 may use client 502 and DB client 520 to request access to database 506. The DB client 520 may initiate the request via a first TLS connection 540 to a TCP socket of client 502, which may send the request from the DB client 520 to a daemon 522.

The daemon 522 may send a request to establish a connection with the database 506 towards the agent 512 in database system 504 by way of a connection node 510 of a bastion host system 508.

The connection node 510 may verify the user 518 or client 502 using a policy enforcement point (PEP) 526, which may access the policy service 516 and its associated policy database 524. If the user 518 is authorized under the policy database 524, the connection node 510 may pass the database connection request on to the agent 512 of the database system 504. The connection node 510 may also perform other operations, such as logging the message.

As described in regard to system 400, one of agent 512 or keymaster 514 may generate a signing key pair, and use it to generate an X.509 client certificate for user 518 or client 502, and partially sign the certificate with the local key shard (e.g., $\text{shard}_2$ 532 for agent 512, or $\text{shard}_1$ 530 for keymaster 514). The initial signer may then provide the partially signed certificate for signing by other entities having key shards.

In an example implementation, the connection node 510 may also provide a copy of the database connection request to the keymaster 514 of bastion host 508. The keymaster 514 may act as a holder of one key shard used to sign client certificates for providing access to database system 504; in this case, $\text{shard}_1$ 530. The keymaster 514 may perform its own policy checks via PEP 528, or may rely on the policy check from connection node 510. In a configuration where the keymaster 514 is a first signing entity for a certificate, the keymaster 514 may generate a signing key pair, and use the key pair to generate an X.509 client certificate for user 518 or client 502. The keymaster 514 may then partially sign the certificate using $\text{shard}_1$ 530.

Once the connection node 510 has verified the database connection request from client 502 and forwarded it to agent 512, the agent may also perform key signing duties using its own shard of the secret key used to sign client certificates, $shard_2$ 532. In examples where the agent 512 is a first signing entity for a certificate, the agent 512 may generate a signing key pair, and use the key pair to generate an X.509 client certificate for user 518 or client 502. The agent 512 may then partially sign the certificate using $shard_2$ 532. As part of its signing process, the keymaster 514 may also perform a policy check via PEP 528 to ensure the client certificate has expected parameters, and possibly to additionally verify the policy rules for user 518 or client 502.

The signatures from all signing entities (e.g., using $shard_1$ 530 and $shard_2$ 532) may be combined via 2PC protocol functionality 534. The split key signatures may be fully combined (represented by a CA certificate 536) to sign a client certificate. Once all key shards have been used to sign the client certificate, it may produce a temporary (Tmp) certificate 538 to function as the client 502 certificate.

As opposed to the architecture of system 400, in system 500 the temporary certificate 538 may be provided to the client 502, e.g., for storage or use at the daemon 522. The daemon 522 may present the temporary certificate 538, via a second TLS connection 542, to a TCP socket of database 506 for authorization. Once authorized, a TLS connection may be established between database 506 and client 502. FIGS. 6-10 depict example methods for key splitting and split-key signing and authentication.

Figure 6:
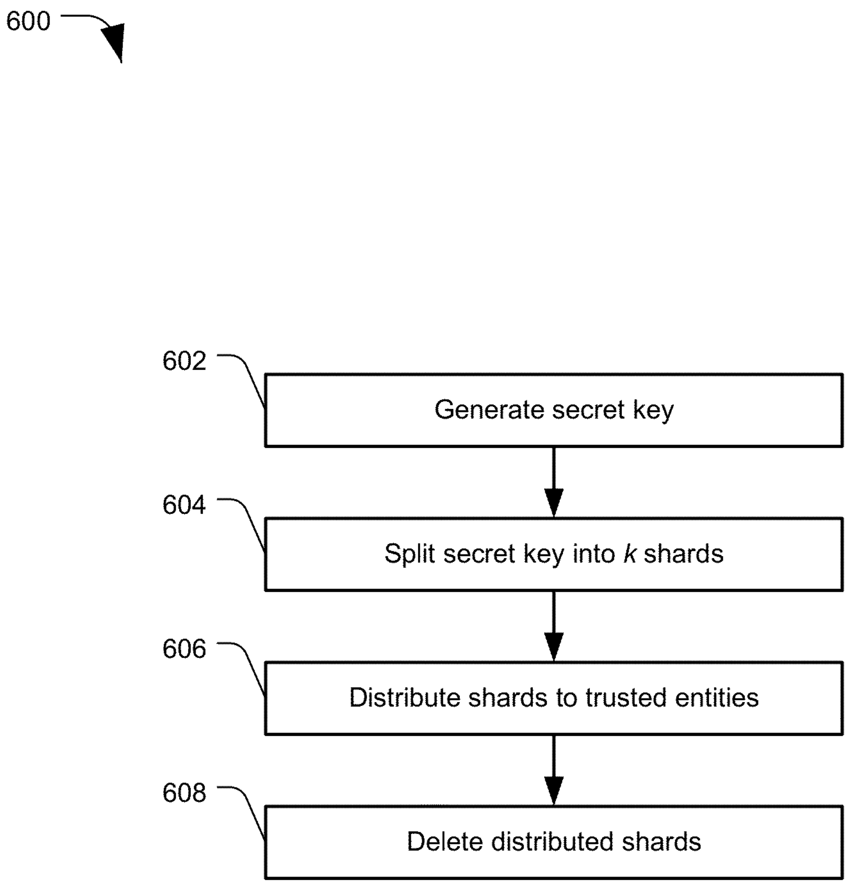
FIG. 6 is a flowchart of an example method for performing multi-party split-key authentication, in accordance with certain embodiments of the present disclosure.

FIG. 6 depicts a flowchart 600 of an example method for multi-party split-key authentication, in accordance with certain embodiments of the present disclosure. In particular, FIG. 6 may depict an example method for splitting a secret key and distributing the shards. The method may be implemented by a certificate authority, certificate service, bastion host, keymaster, key broker, database server, database agent, or other components as described in regard to FIGS. 1-5.

The method may include generating a secret key, at 602. The secret key may be generated as part of an RSA public-private key pair. The public key and secret key pair may be used to generate a root certificate or parent certificate, which may provide authority for child certificates depending on the root or parent certificate. For example, the public key may be included in the certificate, and then a part of the certificate may be signed by the secret key. The same secret key may later be used to sign child certificates to prove they derived from the same root or parent certificate. However, because the secret key may be used to issue new certificates, it presents a security risk to computing systems.

Accordingly, the method may include splitting the secret key into k key shards, at 604. None of the key shards alone may be used to sign a new certificate, and instead all k key shards may be required to sign a certificate.

To prevent the compromise of a single entity from exposing the secret key or all of its shards, the method may include distributing shards to trusted entities, at 606. The entities may include agents or systems trusted by the target environment or resource for which the certificates provide access. The entity that generates the key may distribute all of the key shards, or it may retain one to remain a signing entity itself.

At 608, the method may include deleting the distributed shards. By deleting the distributed shards, the original secret key generating entity will no longer have all the data to reconstruct the secret key. At this point, all the entities holding a secret key shards may need to be compromised in order for a malicious agent to be able to sign new certificates. The entities holding key shards may be configured to work together to perform a signing operation using their respective key shards when a new certificate or other message needs to be signed by the secret key. A method for generating a root certificate and distributing the associated key shards is described in regard to FIG. 7.

Figure 7:
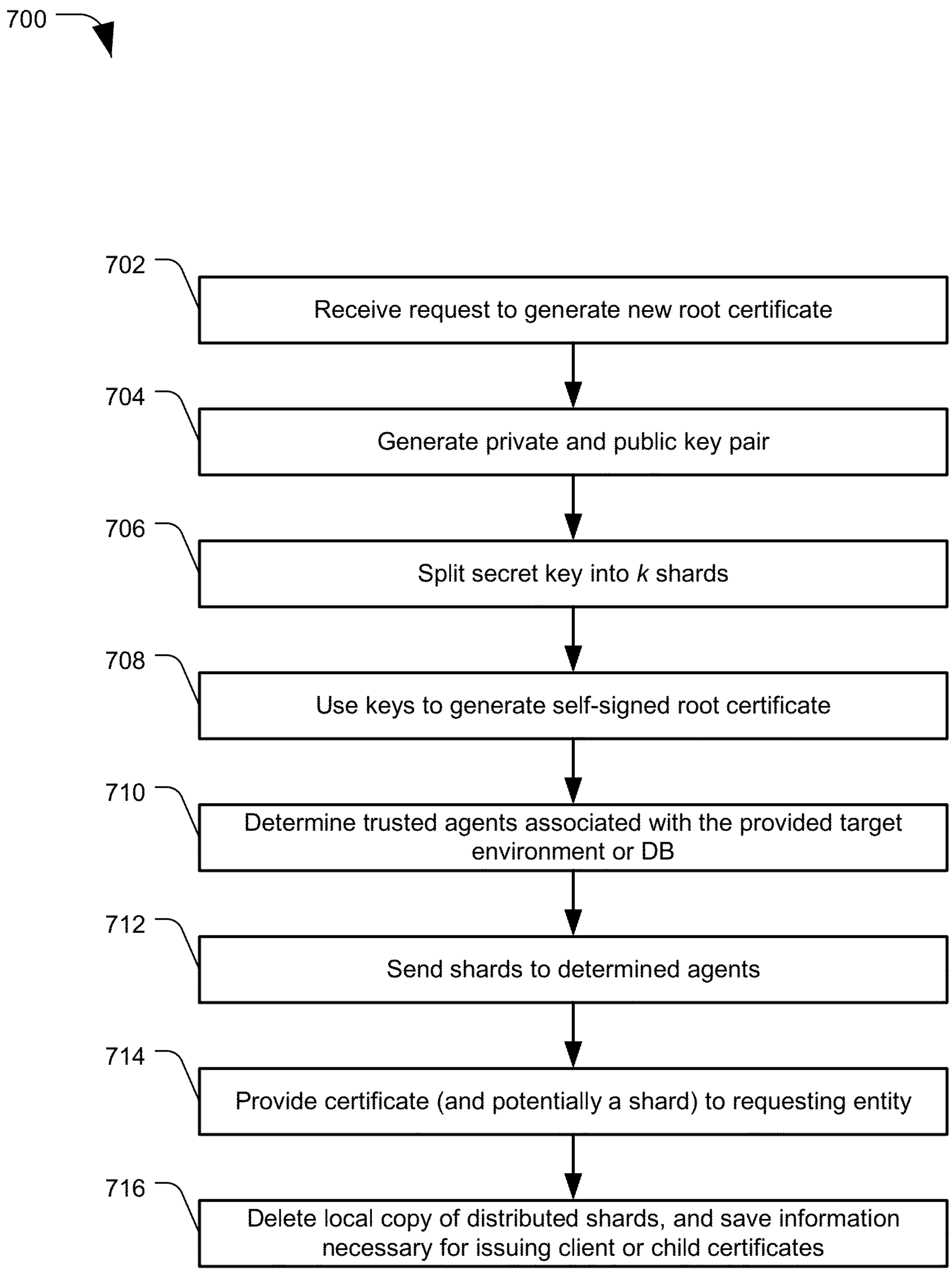
FIG. 7 is a flowchart of an example method for performing multi-party split-key authentication, in accordance with certain embodiments of the present disclosure.

FIG. 7 depicts a flowchart 700 of an example method for multi-party split-key authentication, in accordance with certain embodiments of the present disclosure. In particular, FIG. 7 may depict an example method for generating and providing a copy of a root certificate, and splitting the root secret key into shards. The method may be implemented by a certificate authority, certificate service, bastion host, keymaster, key broker, database server, database agent, or other components as described in regard to FIGS. 1-5.

The method may include receiving a request to generate a new root certificate, at 702. For example, the request may originate from an owner or administrator of a target environment or resource for which authentication may be performed via certificates, such as a database resource. The request may identify the resource. The broker that receives the request may perform a policy check operation to verify that the requestor has the rights or authority to request a new root certificate.

In response to the request, the method may include generating a private and public key pair, at 704. The public key may be intended for distribution, and can verify messages signed with the private or secret key, to verify the source of the signed messages. Conversely, the private or secret key may be used to decrypt messages encrypted with the public key, so that messages encrypted with the public key can only be read by a holder of the corresponding secret key. The public key may be included in a root certificate provided to entities for configuring secure resources to recognize and trust messages or certificates issued by the corresponding broker or signed by the correct key. The configured entities or resources may then verify anything signed by the corresponding secret key of the root certificate in order to establish trust.

At 706, the method may include splitting the secret key into k key shards. The public key and secret key shards may be used to generate a self-signed root certificate, at 708. In some examples, the root certificate may be generated prior to splitting the keys.

At 710, the method may include determining one or more trusted agents associated with the owner or administrator of the target environment or resource, or trusted agents associated with the broker. For example, an administrator may specify its own trusted agents not affiliated with the broker, or the broker may have a list or set of trusted agents if the administrator does not have any or does not specify any. The method may include sending the secret key shards to the determined agents, at 712. The broker may retain a shard and act as a signing agent, or the broker may distribute all key shards and not retain any.

At 714, the method may include providing a copy of the root certificate to the requesting entity, such as the owner or administrator of the target environment or resource. The requesting entity may use the copy of the root certificate to configure the target environment or resource to trust messages or certificates signed by the secret key associated with the root certificate. In some examples, a copy of one of the shards may also be provided to the requesting entity. For example the requesting entity may act as one of the signing agents, or it may operate or run one of the agents, and may provide the key shard to its agent when the agent is initiated (or for an ephemeral agent, each time a new instance of the agent is initiated).

Figure 8:
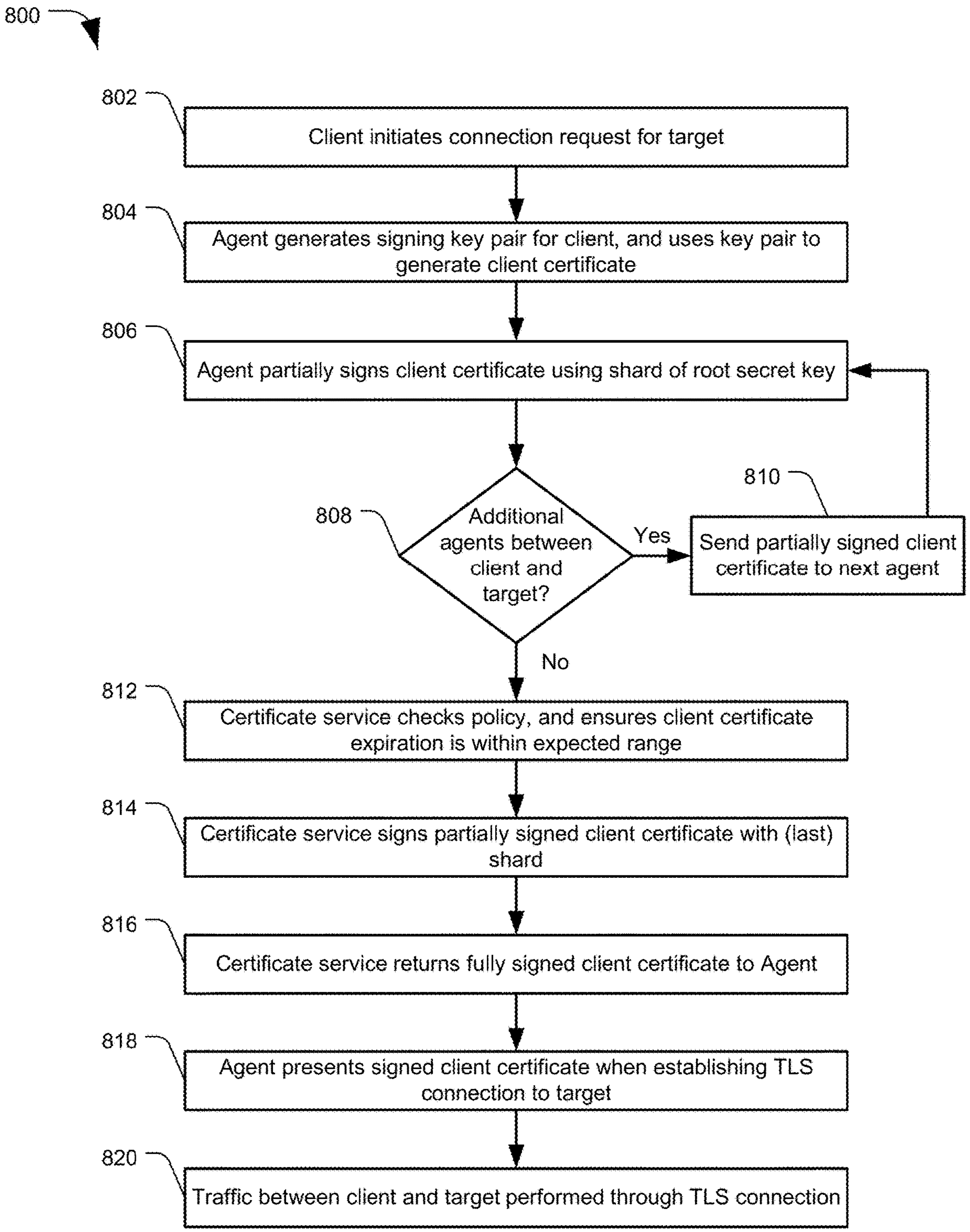
FIG. 8 is a flowchart of an example method for performing multi-party split-key authentication, in accordance with certain embodiments of the present disclosure.

The method may include the broker deleting the local copy of all distributed shards, and saving information necessary for issuing client or child certificates, at 716. For example, client certificates may need to be signed by the split secret key, and so the broker may retain a list or information on all agents holding one of the shards so they can be reached to perform multi-party computation (MPC) for using their key shards to jointly sign a new certificate. The broker may also store details such as a signing algorithm to use, an order of agents for signing, or other details. FIG. 8 depicts a method for generating and signing a client certificate using a split key.

FIG. 8 depicts a flowchart 800 of an example method for multi-party split-key authentication, in accordance with certain embodiments of the present disclosure. In particular, FIG. 8 may depict an example method for generating and signing a client certificate using split key shards. The method may be implemented by a certificate authority, certificate service, bastion host, keymaster, key broker, database server, database agent, or other components as described in regard to FIGS. 1-5.

At 802, a client system may initiate a connection request for a target environment or resource, such as a database. The request may be received at an agent for the resource configured to manage or control access to the resource, including performing client certificate generation and partial signing using a split key shard. In some examples, the agent may also verify the client or otherwise determine whether it is appropriate to generate a client certificate.

At 804, the method may include the agent generating a signing key pair (e.g., an RSA public and private or secret key pair) for the client, and using the key pair to generate a client certificate. In some embodiments, the agent may forward the access request to another entity, such as a key broker, for key pair generation, client certificate generation, or both.

At 806, the agent may partially sign the client certificate using a shard of a root certificate secret key. When the agent signs the client certificate with the agent's root secret key shard, if ever, may depend on where the certificate is generated and when it is appropriate for the agent to sign.

The method may include determining whether there are additional agents holding key shards that need to sign the client certificate, at 808. If so, the method may include sending the partially signed client certificate to the next agent in line to sign, at 810, which agent may sign at 806 and determine any additional agents, at 808.

When the appropriate agents have all signed, at 808, the method may include providing the partially signed certificate to a certificate service. The certificate service may perform a policy check to ensure the client certificate expiration is within an expected range, and potentially to check other aspects, such as whether the requesting client has appropriate access rights under established policies, at 812. If the policy check is passed, the certificate service may sign the partially signed client certificate with a root secret key shard, at 814. It may be noticed that the certificate service may receive the client certificate, and perform policy checks, at any point in the signing process, from being a first signing entity to being a last signing entity.

Once all signatures for the client certificate using key shards have been applied, the method may include the certificate service (or other last signing agent) returning the fully signed client certificate to the agent for the target resource, at 816. The agent may present the signed client certificate to the target when establishing a TLS connection to the target for the client, at 818. Once the target has verified the client certificate was signed by a trusted authority or secret key, it may complete the TLS connection. Traffic between the client and the target may be performed through the established TLS connection, at 820. Processes for signing a certificate or message via multiplicatively or additively split keys are discussed in regard to FIGS. 9 and 10, respectively.

Figure 9:
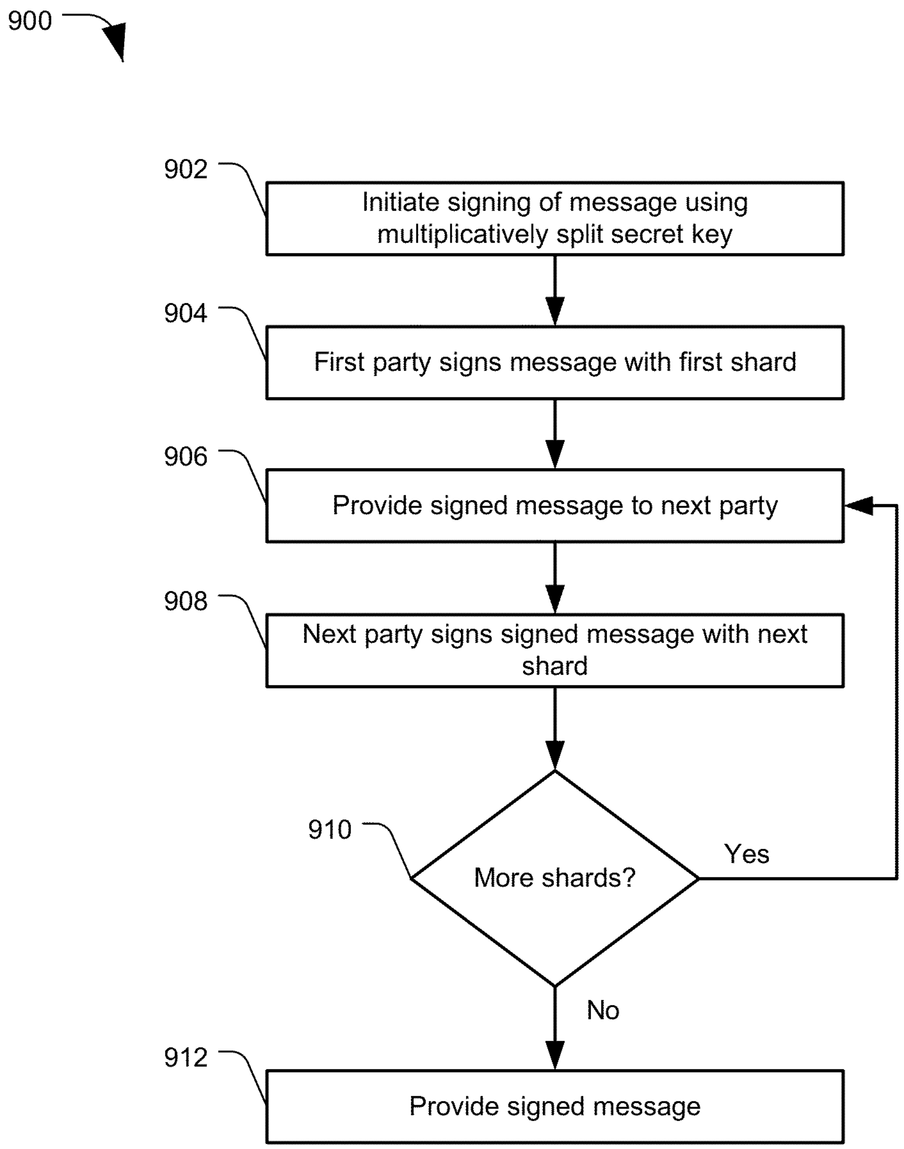
FIG. 9 is a flowchart of an example method for performing multi-party split-key authentication, in accordance with certain embodiments of the present disclosure.

FIG. 9 depicts a flowchart 900 of an example method for multi-party split-key authentication, in accordance with certain embodiments of the present disclosure. In particular, FIG. 9 may depict an example method for signing a message or certificate using multiplicatively split key shards. The method may be implemented by a certificate authority, certificate service, bastion host, keymaster, key broker, database server, database agent, or other components as described in regard to FIGS. 1-5.

The method may include initiating a signing of a message using a multiplicatively split secret key, at 902. As discussed above in regard to FIG. 1, a secret key may be split into key shards according to multiple algorithms, including a multiplicative algorithm and an additive algorithm. The algorithms signing a message using the split key shards may be different depending on the algorithm used to split the key. Multiplicatively split keys may be used in sequence when signing a message, such that the key shards should be used in a sequential order to further sign a partially signed message, until all key shards have been used.

Accordingly, a first party (e.g., having a first key shard $d_1$) may sign the message first, at 904, producing a partially signed message. The first party may provide the partially signed message to a next party (e.g., having the second key shard $d_2$), at 906. The next party may sign the partially signed message with its shard, at 908.

At 910, a determination may be made whether there are more shards that still need to be used to sign the message (e.g., was the last party to sign the one with the final key shard). If there are more shards, the method may return to 906, and the partially signed message may be provided to the next signing entity in the sequence. When there are no more shards, at 910, the method may include providing the fully signed message to an appropriate entity, at 912. For example, in the case of the message including a child or client certificate, the signed certificate may be provided to an agent for a target entity or resource, to the target resource itself, to the requesting client, or otherwise distributed. A method for using additively split keys is described in regard to FIG. 10.

Figure 10:
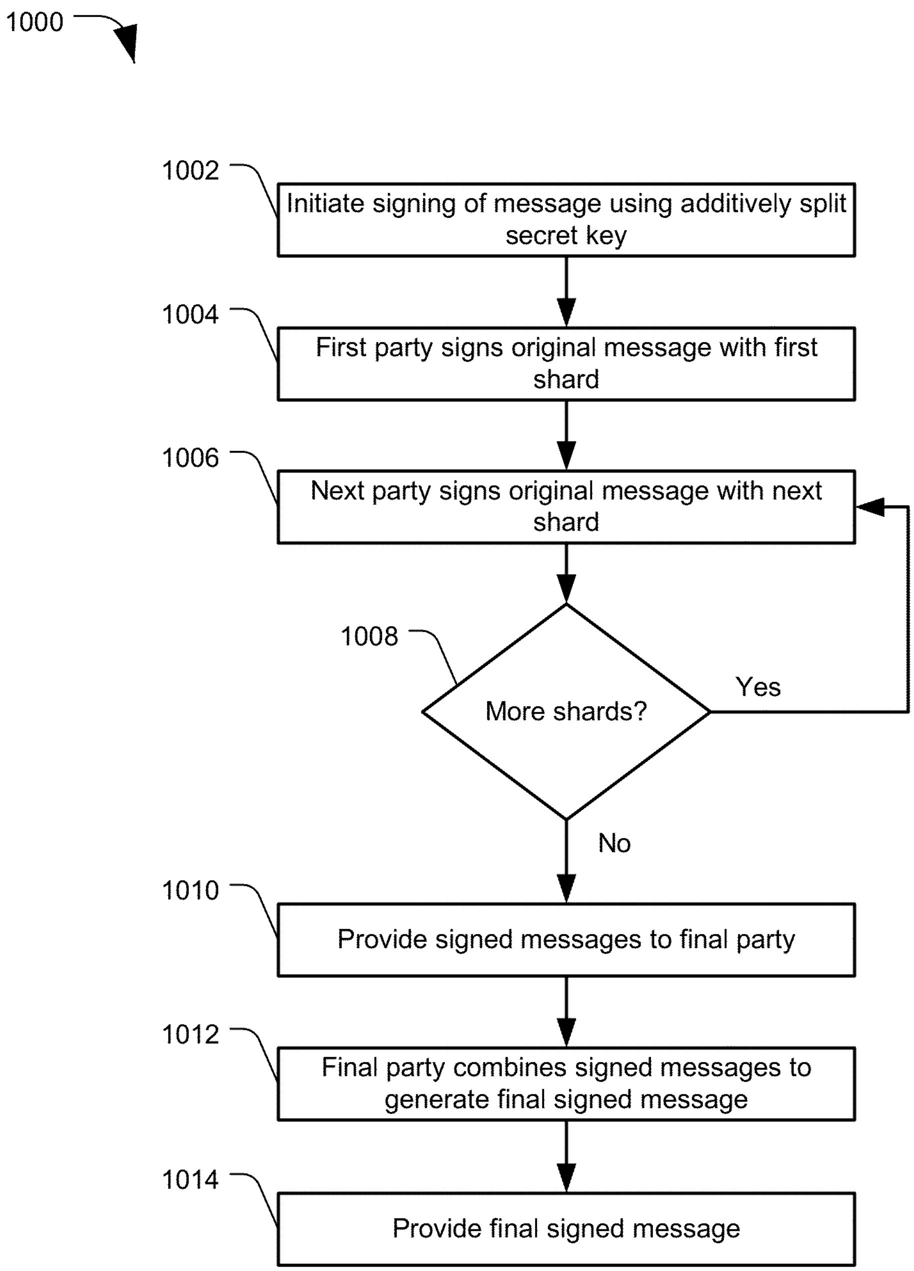
FIG. 10 is a flowchart of an example method for performing multi-party split-key authentication, in accordance with certain embodiments of the present disclosure.

FIG. 10 depicts a flowchart 1000 of an example method for multi-party split-key authentication, in accordance with certain embodiments of the present disclosure. In particular, FIG. 10 may depict an example method for signing a message or certificate using additively split key shards. The method may be implemented by a certificate authority, certificate service, bastion host, keymaster, key broker, database server, database agent, or other components as described in regard to FIGS. 1-5.

The method may include initiating a signing of a message using an additively split secret key, at 1002. Additively split keys may be used to each independently sign the original message, with a final entity combining the individual partially signed messages to generate a final fully signed message.

Accordingly, a first party may sign the original message with a first key shard $d_1$, at 1004, producing a first partially signed message. A next party may sign the original message with a next key shard (e.g., the second key shard $d_2$), at 1006. Each party may send its own partially signed message and the original message (and any previous partially signed messages from previous parties) to a next party, or the original message may be distributed to all signing parties, which may each individually partially sign and provide their partially signed messages to a final party.

At 1008, a determination may be made whether there are more shards that still need to be used to sign the message. If there are more shards, the method may return to 1006, where a next party signs the original message with the party's key shard. When there are no more shards, at 1010, the method may include providing all the individual partially signed message to final party, at 1010. The final party may have the final key shard and may sign the original message with it, or the final party may simply combine the partially signed messages from other parties. In either event, the final party may combine the partially signed messages to generate the final fully signed message, at 1012. At 1014, the method may include providing the final fully signed message to an appropriate entity. For example, in the case of the message including a child or client certificate, the fully signed certificate may be provided to an agent for a target entity or resource, to the target resource itself, to the requesting client, or otherwise distributed. A system configured to perform multi-party split key authentication is described in regard to FIG. 11.

Figure 11:
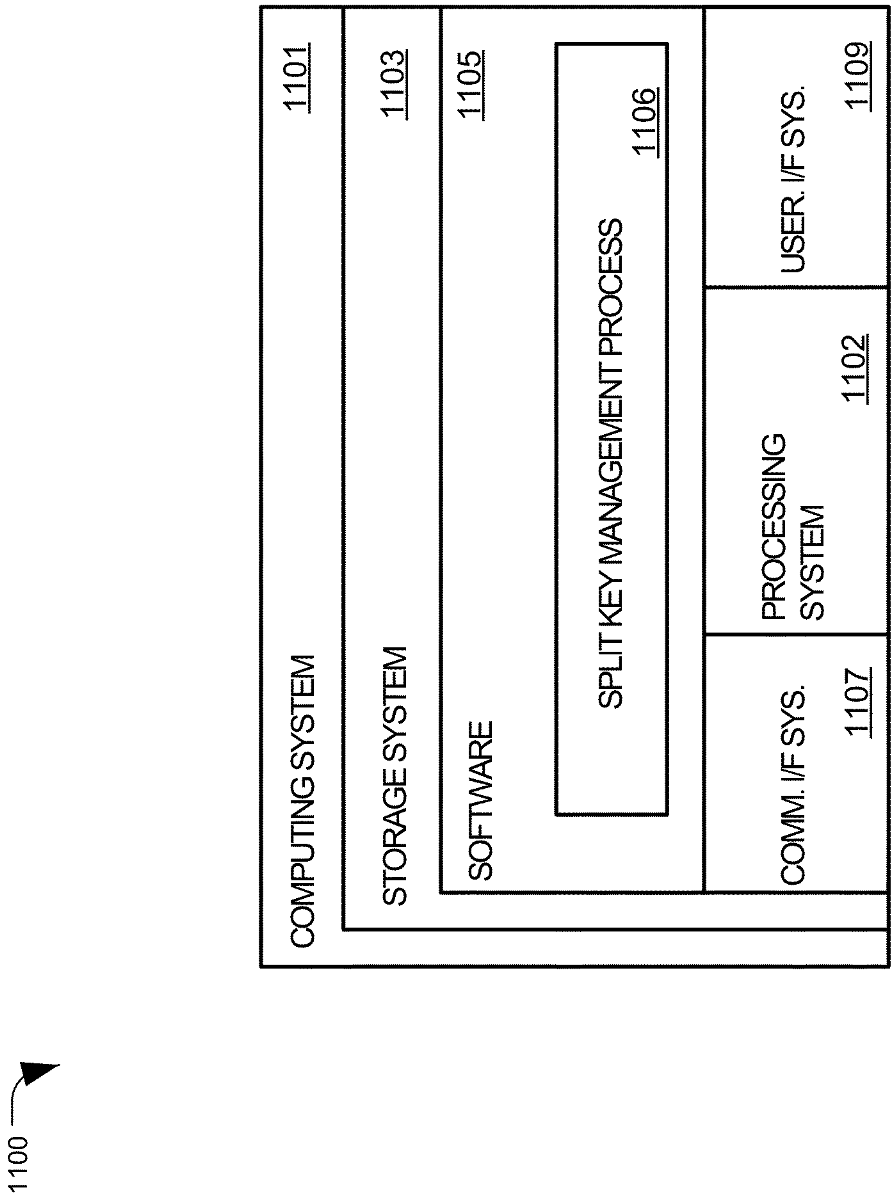
FIG. 11 is a diagram of a system configured to perform multi-party split-key authentication, in accordance with certain embodiments of the present disclosure.

FIG. 11 illustrates an apparatus 1100 configured to perform a local update from a global catalog of device and system attributes, in accordance with certain embodiments of the present disclosure. The apparatus 1100 may include a computing system 1101 that is representative of any system or collection of systems in which the various processes, systems, programs, services, and scenarios disclosed herein may be implemented. For example, computing system 1101 may be an example of a client system, database server, database agent, database administrator, certificate authority, key broker, certificate service, policy module, connection node, or other computing systems described herein. Examples of computing system 1101 include, but are not limited to, server computers, desktop computers, laptop computers, routers, web servers, cloud computing platforms, and data center equipment, as well as any other type of physical or virtual server machine, physical or virtual router, container, communications network equipment, and any variation or combination thereof.

Computing system 1101 may be implemented as a single apparatus, system, or device or may be implemented in a distributed manner as multiple apparatuses, systems, or devices. Computing system 1101 may include, but is not limited to, processing system 1102, storage system 1103, software 1105, communication interface system 1107, and user interface system 1109. Processing system 1102 may be operatively coupled with storage system 1103, communication interface system 1107, and user interface system 1109.

Processing system 1102 may load and execute software 1105 from storage system 1103. Software 1105 may include and implement a split key management process 1106, which may be representative of any of the operations for generating RSA public-private key pairs, generating root or client certificates, splitting private keys into a plurality of key shards, and using split key shards to sign messages and certificates, as discussed with respect to the preceding figures. When executed by processing system 1102 to perform global catalog synchronization, software 1105 may direct processing system 1102 to operate as described herein for at least the various processes, operational scenarios, and sequences discussed in the foregoing implementations. Computing system 1101 may optionally include additional devices, features, or functionality not discussed for purposes of brevity.

In some embodiments, processing system 1102 may comprise a micro-processor and other circuitry that retrieves and executes software 1105 from storage system 1103. Processing system 1102 may be implemented within a single processing device but may also be distributed across multiple processing devices or sub-systems that cooperate in executing program instructions. Examples of processing system 1102 may include general purpose central processing units, graphical processing units, application specific processors, and logic devices, as well as any other type of processing device, combinations, or variations thereof.

Storage system 1103 may comprise any memory device or computer readable storage media readable by processing system 1102 and capable of storing software 1105. Storage system 1103 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1103 may also include computer readable communication media over which at least some of software 1105 may be communicated internally or externally. Storage system 1103 may be implemented as a single storage device but may also be implemented across multiple storage devices or sub-systems co-located or distributed relative to each other. Storage system 1103 may comprise additional elements, such as a controller, capable of communicating with processing system 1102 or possibly other systems.

Software 1105 (including split key management process 1106 among other functions) may be implemented in program instructions that may, when executed by processing system 1102, direct processing system 1102 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1105 may include additional processes, programs, or components, such as operating system software, virtualization software, or other application software. Software 1105 may also comprise firmware or some other form of machine-readable processing instructions executable by processing system 1102.

In general, software 1105 may, when loaded into processing system 1102 and executed, transform a suitable apparatus, system, or device (of which computing system 1101 is representative) overall from a general-purpose computing system into a special-purpose computing system customized to implement the systems and processes as described herein. Indeed, encoding software 1105 on storage system 1103 may transform the physical structure of storage system 1103. The specific transformation of the physical structure may depend on various factors in different implementations of this description. Examples of such factors may include, but are not limited to, the technology used to implement the storage media of storage system 1103 and whether the computer-storage media are characterized as primary or secondary storage, as well as other factors.

For example, if the computer readable storage media are implemented as semiconductor-based memory, software 1105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1107 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 1101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:

a processor; and a non-transitory machine-readable storage medium that provides instructions that, when executed by the processor, causes a keymaster to:

receive a request for a root certificate;

generate a key pair including a secret key and a public key based on the request;

generate the root certificate based on the secret key, the root certificate including the public key;

split the secret key into a plurality of shards;

provide a first shard of the plurality of shards to an agent;

delete the first shard at the keymaster, wherein a second shard of the plurality of shards is retained by the keymaster;

receive a partially signed client certificate signed with the first shard from the agent, the agent operating within a domain of a target resource;

generate a fully signed client certificate based on the partially signed client certificate and using the second shard; and issue the fully signed client certificate to a client system seeking access to the target resource.

2. The system of claim 1, wherein the instructions further cause the keymaster to:

split the secret key based on a multiplicative algorithm.

3. The system of claim 2, wherein the instructions further cause the keymaster to:

generate the fully signed client certificate using a multiplicative signing algorithm, including:

perform signing of a client certificate in a sequential order with the agent, includes applying signatures to the client certificate in a set order corresponding to the plurality of shards; and sign the partially signed client certificate using the second shard.

4. The system of claim 1, wherein the instructions further cause the keymaster to:

split the secret key based on an additive algorithm.

5. The system of claim 4, wherein the instructions further cause the keymaster to:

generate the fully signed client certificate using an additive signing algorithm, including:

perform signing of a client certificate by multiple parties individually, wherein:

each party signs an unsigned copy of the client certificate using a corresponding one of the plurality of shards; and a final party combines each individually signed client certificate; and sign a copy of the client certificate at the keymaster using the second shard.

6. A method comprising:

receiving, at a keymaster, a request for a root certificate;

generating, at the keymaster, a key pair including a secret key and a public key based on the request;

generating, at the keymaster, the root certificate based on the secret key, the root certificate including the public key;

splitting the secret key into a plurality of shards via the keymaster;

providing a first shard of the plurality of shards from the keymaster to an agent;

deleting the first shard at the keymaster, wherein a second shard of the plurality of shards is retained by the keymaster;

receiving, at the keymaster, a partially signed message signed with the first shard from the agent, the agent operating within a domain of a target resource, and wherein the partially signed message includes a partially signed client certificate for a client system seeking access to a target resource;

generating, at the keymaster, a fully signed message based on the partially signed message and using the second shard, wherein the fully signed message includes a fully signed client certificate; and issuing the fully signed message to the agent.

7. The method of claim 6, further comprising:

splitting the secret key based on a multiplicative algorithm.

8. The method of claim 7, further comprising:

generating the fully signed message using a multiplicative signing algorithm, including:

performing signing of a message in a sequential order with the agent, includes applying signatures to the message in a set order corresponding to the plurality of shards; and signing the partially signed message at the keymaster using the second shard.

9. The method of claim 6, further comprising splitting the secret key based on an additive algorithm.

10. The method of claim 9, further comprising:

generating the fully signed message using an additive signing algorithm, including:

performing signing of a message by multiple parties individually, wherein:

each party signs an unsigned copy of the message using a corresponding one of the plurality of shards; and a final party combines each individually signed message; and signing a copy of the message at the keymaster using the second shard.

11. A memory device storing instructions that, when executed, cause a processor to perform a method comprising:

receiving, at a keymaster, a request for a root certificate;

generating, at the keymaster, a key pair including a secret key and a public key based on the request;

generating, at the keymaster, the root certificate based on the secret key, the root certificate including the public key;

splitting the secret key into a plurality of shards via the keymaster;

providing a first shard of the plurality of shards from the keymaster to an agent;

deleting the first shard at the keymaster, wherein a second shard of the plurality of shards is retained by the keymaster;

receiving, at the keymaster, a partially signed message signed with the first shard from the agent, the agent operating within a domain of a target resource, and wherein the partially signed message includes a partially signed client certificate for a client system seeking access to a target resource;

generating, at the keymaster, a fully signed message based on the partially signed message and using the second shard, wherein the fully signed message includes a fully signed client certificate; and issuing the fully signed message.

12. The memory device of claim 11, storing instructions that, when executed, cause the processor to perform the method further comprising:

splitting the secret key based on a multiplicative algorithm; and generating the fully signed message using a multiplicative signing algorithm, including:

performing signing of a message in a sequential order with the agent, includes applying signatures to the message in a set order corresponding to the plurality of shards; and signing the partially signed message at the keymaster using the second shard.

13. The memory device of claim 11, storing instructions that, when executed, cause the processor to perform the method further comprising:

splitting the secret key based on an additive algorithm; and generating the fully signed message using an additive signing algorithm, including:

performing signing of a message by multiple parties individually, wherein:

each party signs an unsigned copy of the message using a corresponding one of the plurality of shards; and a final party combines each individually signed message; and signing a copy of the message at the keymaster using the second shard.

14. The memory device of claim 11, wherein the fully signed message is issued to the agent.

15. The memory device of claim 11, wherein the fully signed message is issued to the client system.

* * * * *